(12) United States Patent
Paajanen et al.

(10) Patent No.: US 7,349,404 B1
(45) Date of Patent: Mar. 25, 2008

(54) METHOD AND SYSTEM FOR CONNECTION SET-UP IN A COMMUNICATION SYSTEM COMPRISING SEVERAL SWITCHING UNITS AND SEVERAL PROCESSING UNITS

(75) Inventors: Timo Paajanen, Nurmijärvi (FI); Jyrki Ruohio, Helsinki (FI); Timo Harjunen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/257,914

(22) PCT Filed: Apr. 19, 2000

(86) PCT No.: PCT/EP00/03566

§ 371 (c)(1),
(2), (4) Date: Mar. 17, 2003

(87) PCT Pub. No.: WO01/84876

PCT Pub. Date: Nov. 8, 2001

(51) Int. Cl.
*H04L 12/28* (2006.01)
*H04L 12/56* (2006.01)

(52) U.S. Cl. .................. 370/395.3; 370/469

(58) Field of Classification Search ........... 370/395, 370/227, 389, 350, 392, 230, 355, 395.1, 370/395.3, 469
See application file for complete search history.

(56) References Cited

U.S. PATENT DOCUMENTS 5,809,025 A  9/1998  Timbs .................. 370/400
6,038,215 A * 3/2000  Uekumasu ............ 370/230
6,603,767 B1 * 8/2003  Murakami et al. ..... 370/395.64
6,771,647 B1 * 8/2004  Richards et al. ...... 370/395.4

FOREIGN PATENT DOCUMENTS

EP   1 011 211 A1   4/1998
WO   97/24841      7/1997

OTHER PUBLICATIONS

Park, et al., "The Design of Reliable Controller for Interporcessor Communication Network using ATM Switch", Sep. 15, 1998, System Sciences 1998, Proceedings of the Hawaii Int Conf On, vol. 3, Jan. 6-9, 1998, pp. 263-272 XP002901613.
International Search Report.

(Continued)

*Primary Examiner*—Chau Nguyen
*Assistant Examiner*—Kenneth R Hartmann
(74) *Attorney, Agent, or Firm*—Squire, Sanders & Dempsey L.L.P.

(57) ABSTRACT

The invention provides a method and system for connection set-up in a communication system which comprises a plurality of first processing units, e.g. switching units, and a plurality of second processing units, and transmits information as a stream of information cells having cell identification. For reducing the number of messages in setting up connections, the first processing units are connected to the second processing units, and information cells are supplied to several processing units which distinguish between the cells based on the cell identification for further processing. The information is preferably ATM transmitted, and all first processing units are connected to all second processing units using virtual path connections on the ATM layer. The processing unit to which the information cell is directed is identified using virtual channel.

35 Claims, 5 Drawing Sheets

OTHER PUBLICATIONS

TR 100 815 v.1.1.1, "Digital Video Broadcasting (DVB); Guidelines for the handing of Asynchronous Transfer Mode (ATM) signals in DBV systems," European Broadcasting Union Institute, (1999-2002), pp. 1-12.

AF-PHY-0017.000, Utopia Specification, Level 1, Version 2.01, The ATM Forum Technical Committee, Mar. 21, 1994, pp. 1-15.

* cited by examiner

METHOD AND SYSTEM FOR CONNECTION SET-UP IN A COMMUNICATION SYSTEM COMPRISING SEVERAL SWITCHING UNITS AND SEVERAL PROCESSING UNITS

FIELD OF THE INVENTION

The present invention relates to a method and system for the setup of connections in a communication system comprising several switching units and several processing units. Such a system is generally necessary for transmitting information to a desired destination, for instance in a system using ATM (Asynchronous Transfer Mode) transmission.

BACKGROUND OF THE INVENTION

In UMTS/3G (Universal Mobile Telecommunication System, Third generation) mobile networks, RNC (Radio Network Controller) and ATM (Asynchronous Transfer Mode) module network elements may be implemented using a concept which has separate switching units, for instance AAL (ATM Adaptation Layer, such as AAL2 ATM Adaptation Layer type 2) switching units, and separate DSP (Digital Signal Processor) processor units. A DSP is designed for signal and data handling, resembling an ordinary microprocessor. AAL2 switching units are used for demultiplexing and multiplexing AAL2 type of traffic from normal N_cid format to AAL2 1_cid format. N_cid means that one ATM cell contains several AAL2 microcells. 1_cid means that ATM cells contain only one AAL2 microcell. The basic switching function is the functionality when received N_cid is demultiplexed into 1_cids, and 1_cid, received in other direction, is multiplexed with other 1_cids to specific N_cid. N_cid is always received from, or sent to the network and 1_cid is an internal format between AAL2 switching units and between AAL2 unit and DSP processor unit. The above described type of network elements is merely presented as an example. The invention can be implemented in any type of network elements.

FIG. 4 illustrates the switching topologies in two typical switching cases. The upper part shows a first typical switching case, whereas the lower part shows another typical switching case. In FIG. 4 and the other Figures, several signal processing units such as NIU (Network Interface Unit) are shown.

It is obvious from FIG. 4 that the ATM module switching case (upper part) contains only three ATM-level connections whereas the RNC switching case needs four ATM-level cross-connections. These connections are currently handled under the leg concept schematically shown in FIG. 5. As illustrated in FIG. 5, ATM connections are provided for interconnecting the network elements in such a manner that legs are formed which end between the MDC and right-hand AAL2 element and are connected by means of a leg connector for finally providing a through switch connection.

The requirements for handling the connection are high and the creation of an ATM connection is quite complex due to Quality of Service (QoS) requirements, hardware structure and so on. For making one ATM connection in the ATM level, a minimum of four messages across the computers inside the switching system is required. In other structures, it may be possible to implement such an ATM connection with two messages. However, in basic cases four cross-connections per one through switch connection are created.

The number of created ATM connections will advantageously be reduced when providing N_cid connections because one N_cid contains several connections. For instance, an N_cid VCC (Virtual Channel Connection) is created only once for 248 N_cids (in optimal situation). N_cid is terminated in AAL2 switching unit and there are for each cid one ATM layer level VCC connection. The VCC connection needs to be created every time when a new AAL2 connection is created. The same applies for the case of deletion of connections.

In the following, some problems related to these connection setup requirements are discussed. The ATM connection control needs a very fast data management tool to handle all the termination point and cross-connection object setups and deletions. Further, the number of messages required and/or the number of all connection setup/deletions per unit time such as 1 second is very high. MXU's SAR (Multiplexer Unit's Segmentation and Reassembly) and CPU (Central processing unit) processing performance is required to be very high to be adequate for handling the data streams. Moreover, a heavy CAC (Connection Admission Control) load occurs as each setup goes through CAC in several points (corresponding to hardware (HW)).

The invention relates, among others, to Virtual Channel and Virtual Path technology. A virtual channel (VC) designates a unidirectional transport of ATM cells associated by a common unique identifier value. A virtual channel connection (VPC) is a concatenation of virtual channel links that forms an ATM connection between a transmitting party and a receiving party, and in which both virtual path and virtual channel identifiers are used. A virtual path (VP) means a unidirectional transport of ATM cells that are associated by a common identifier value. A virtual path connection (VPC) is a concatenation of virtual path links that extends between the point where the virtual channel identifier values are assigned and the point where those virtual values are translated or removed.

BRIEF SUMMARY OF THE INVENTION

Since the requirements for call handling, especially for BHCA (Busy Hour Call Attempt), are high and the ATM switching setup is complex, the invention aims at finding a solution for making connection setup more efficient and provide more performance to satisfy the performance requirements.

The invention provides, for achieving this task, a method and/or system for connection set-up in a communication system which comprises a plurality of first processing units and a plurality of second processing units, and transmits information as a stream of information cells having cell identification, wherein the first processing units are connected to the second processing units, and information cells are supplied to several processing units which distinguish between the cells based on the cell identification for further processing. The first processing units may be AAL switching units and the second processing units may be signal processing units. Alternatively, the first and second processing units can be AAL switching units, or may be implemented as signal processing units. Preferably, the information is ATM transmitted.

The first and/or second processing units may each contain one or more digital signal processing units.

In a preferred embodiment, all first processing units are connected to all second processing units using virtual path connections on the ATM layer.

That processing unit to which the information cell is directed is preferably identified using the virtual channel identifier.

The resources between the first and second processing units are preferably reserved by virtual path.

In a preferred embodiment, the virtual channel identifiers (VCIs) are known only in the first and second processing units. Therefore, it is not necessary that the VCIs are known for example in the switching means provided between the processing units. This feature reduces the necessary storage capacity and operational load of the switching means which may be composed for instance of multiplexers and switching fabric.

The first processing units may be connected to each other by means of such a switching means, or by a general bus, for example a message bus. The second processing units may be connected to each other, and/or to the first processing units, in a similar manner.

Furthermore, the cell identifications are preferably allocated by a resource manager. The resource manager may deliver the VCIs taking account of the capacity and the services that are offered by the processing units. The resource manager preferably also knows all Virtual Path Identifiers (VPIs).

The resource manager preferably takes care of the connection set-ups between the processing units, and knows the resources of the processing units.

One of the additional advantages of the invention is that the resource manager does not need much time in calculating for example the Connection Admission Control (CAC) in every connection set-up between processing units.

The first and/or second processing units may comprise AAL switching units which preferably differentiate different AALs by different Virtual Channel Identifiers (VCIs).

The invention provides a virtual path piping (in the following also termed VP-piping) which is a simple and yet very effective concept which significantly increases the performance by reducing the amount of required messages in the connection setup. This concept utilizes only the basic ATM functionalities and makes advantage of the hardware concept used in the system.

DETAILED DESCRIPTION OF PREFERRED EMBODIMENTS OF THE INVENTION

First, the basics of the proposed connection solution using the concept of VP piping (Virtual Path piping) will be described. Thereafter, a more detailed implementation and requirements from hardware (HW) and software (SW) point of view will be discussed.

The key idea of the VP piping is to connect all the switching units in the adaptation layer such as AAL (e.g. AAL2) switching units, to all processing units such as DSP processing units, with virtual path connections (VPC). This leads to the creation of a full mesh topology between the AAL (e.g. AAL2) and DSP units. After creation of this topology there is no need for making any further ATM-layer level connection setups at all. It is only necessary that virtual channels are reserved from the SAR (Segmentation and Reassembly) devices in the AAL2 and the DSP units to be able to make VCC (Virtual Channel Connection).

Figure 1:
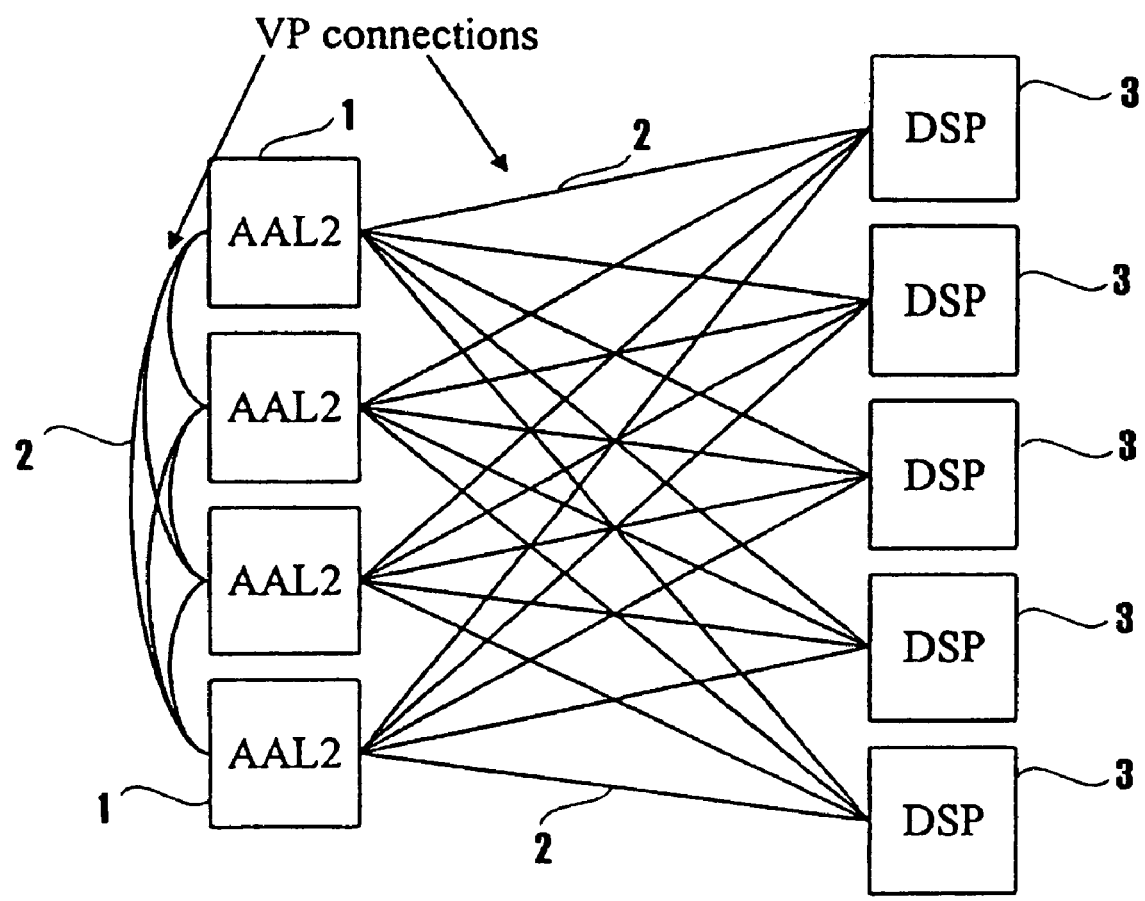
FIG. 1 shows a basic structure of virtual path connections between network elements in a preferred embodiment of the invention.

FIG. 1 illustrates the resulting topology structure with fully developed virtual path connections 2 between the AAL switching units 1 and the DSP (Digital Signal Processor) units 3. The virtual path connections are generated not only between all switching units 1 and all DSP units 3 but also between each of the switching units 1 as shown in FIG. 1.

When the VPC (Virtual Path Connection) topology shown in FIG. 1 is created beforehand, the number of ATM-layer level connection setups and deletions are reduced during runtime to zero.

The basic solution to use VPCs on the ATM layer is no problem for the hardware. Likewise, the VC (Virtual Channel) reservation is not problematic for the hardware.

DSP units (e.g. Cofigurable DSPs) 2 and AAL2 Units 1 are, in this embodiment, units with several processors. Each processor is capable of receiving and sending cells (i.e. processors have SAR capabilities). There is preferably only one interface for each unit which is shared (commonly used) by each processor of the respective unit. In such an environment a capability to transfer a cell (information or message cell) through one interface to the appropriate processor is needed. Furthermore, the functionality of sharing this interface between several processors sending at the same time is necessary.

The hardware part of the present invention provides both these functionalities and comprises a FIFO memory 4 (FIG. 2) which may consist of an UTOPIA extender and/or a First-In First-Out buffer. Regarding the specification of UTOPIA, see for instance TR 100 815 V1.1.1 (1999-02) of ETSI (European Telecommunications Standards Institute), or AF-PHY-0017.000: "The ATM Forum Technical Committee, UTOPIA Specification, Level 1, Version 2.01".

Figure 2:
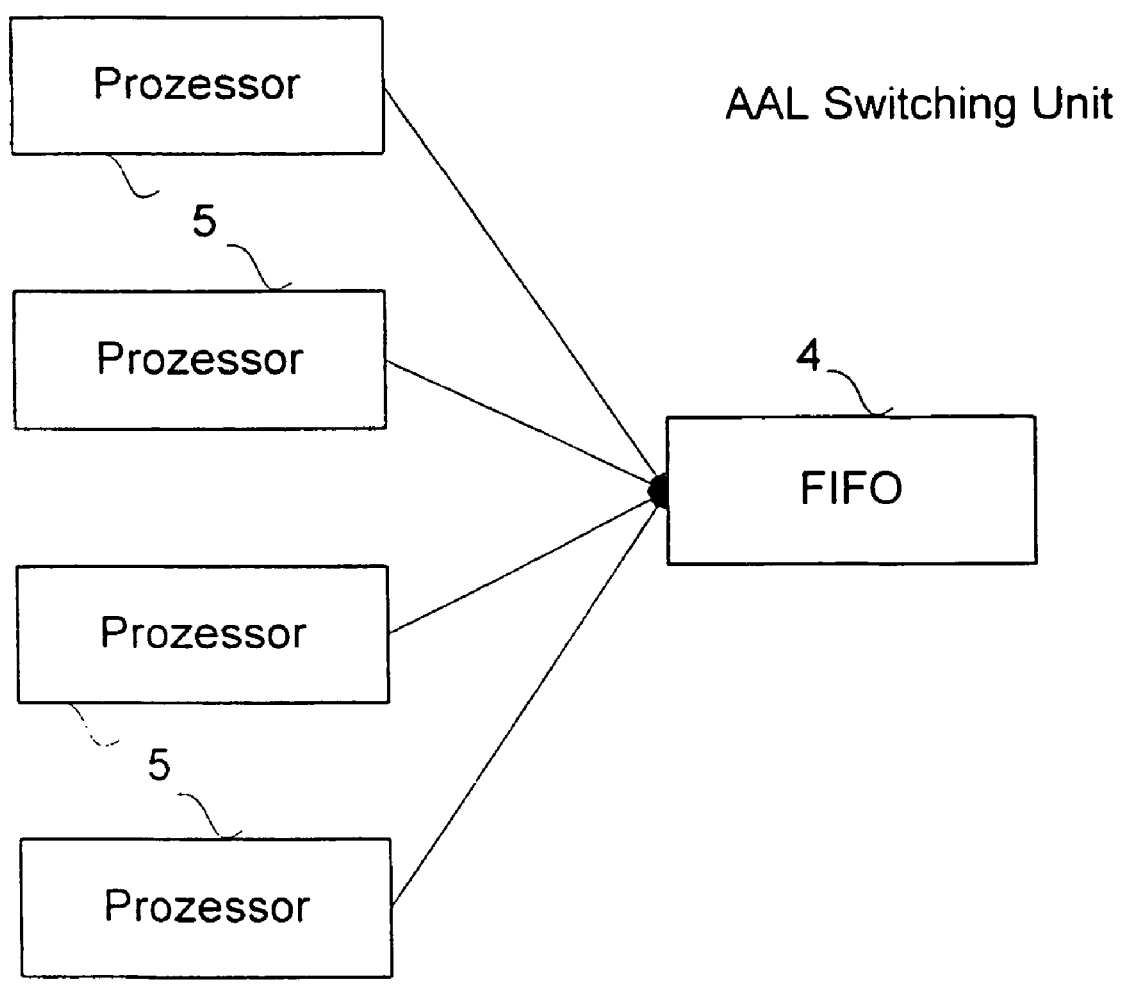
FIG. 2 illustrates the structure of the AAL switching units.

FIG. 2 shows an example of an AAL2 switching unit providing this function. The other switching units are similarity structured. In one direction (towards the processors 5), the FIFO 4 receives cells and copies each cell to each processor 5. In the other direction, the traffic from the processors 5 is queued in the FIFO 4 and is sent forward in accordance with the first-in first-out method.

(UTOPIA) FIFO functionality in this form means that each cell is received by all the processors 5 in this unit. The distinction between which processor will actually use the cell and will not discard it, is made based on the active SAR channels. The processor's SAR functionality which identifies the cell (channel is opened with the same VPI, VCI (Virtual Path Identifier, Virtual Channel Identifier) as is specified in the received cell) can receive the cell. Processors that do not recognize the VPI, VCI of the received cell are arranged to discard it.

In this way, it will be ensured that only one processor can open a specified channel. Because of this rule, i.e. based on the defined ATM functionality, only one processor can receive the cell and the other processors will discard it.

Figure 3:
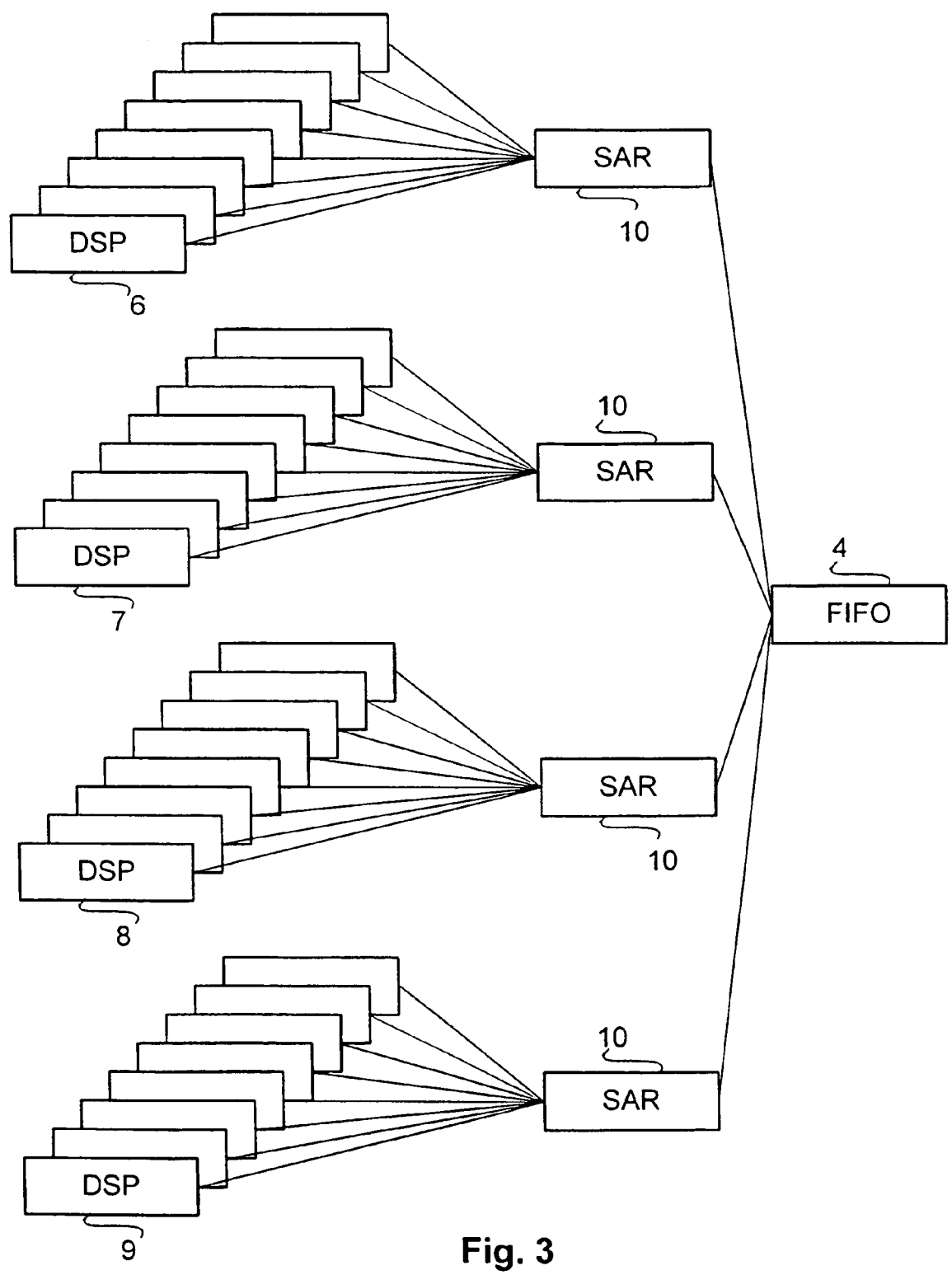
FIG. 3 shows a structure of a DSP arrangement of an embodiment.
Figure 4:
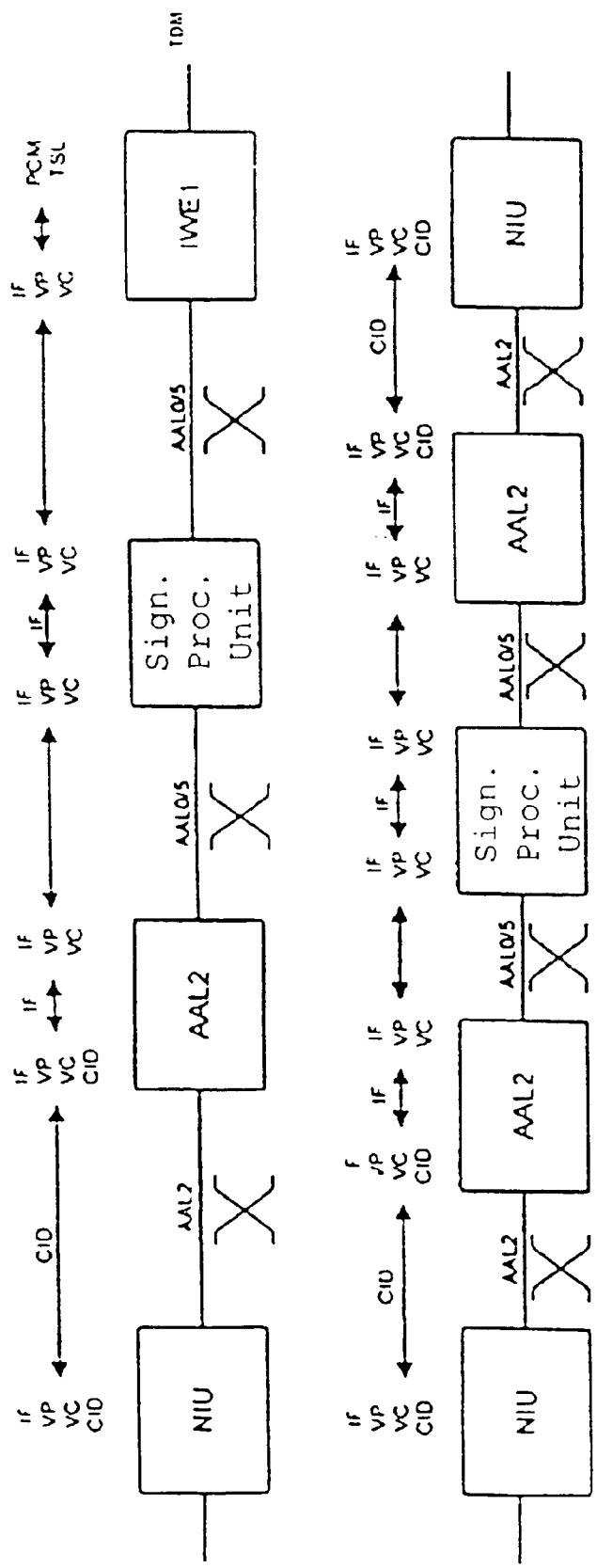
FIG. 4 shows two switching topologies for typical switching cases.
Figure 5:
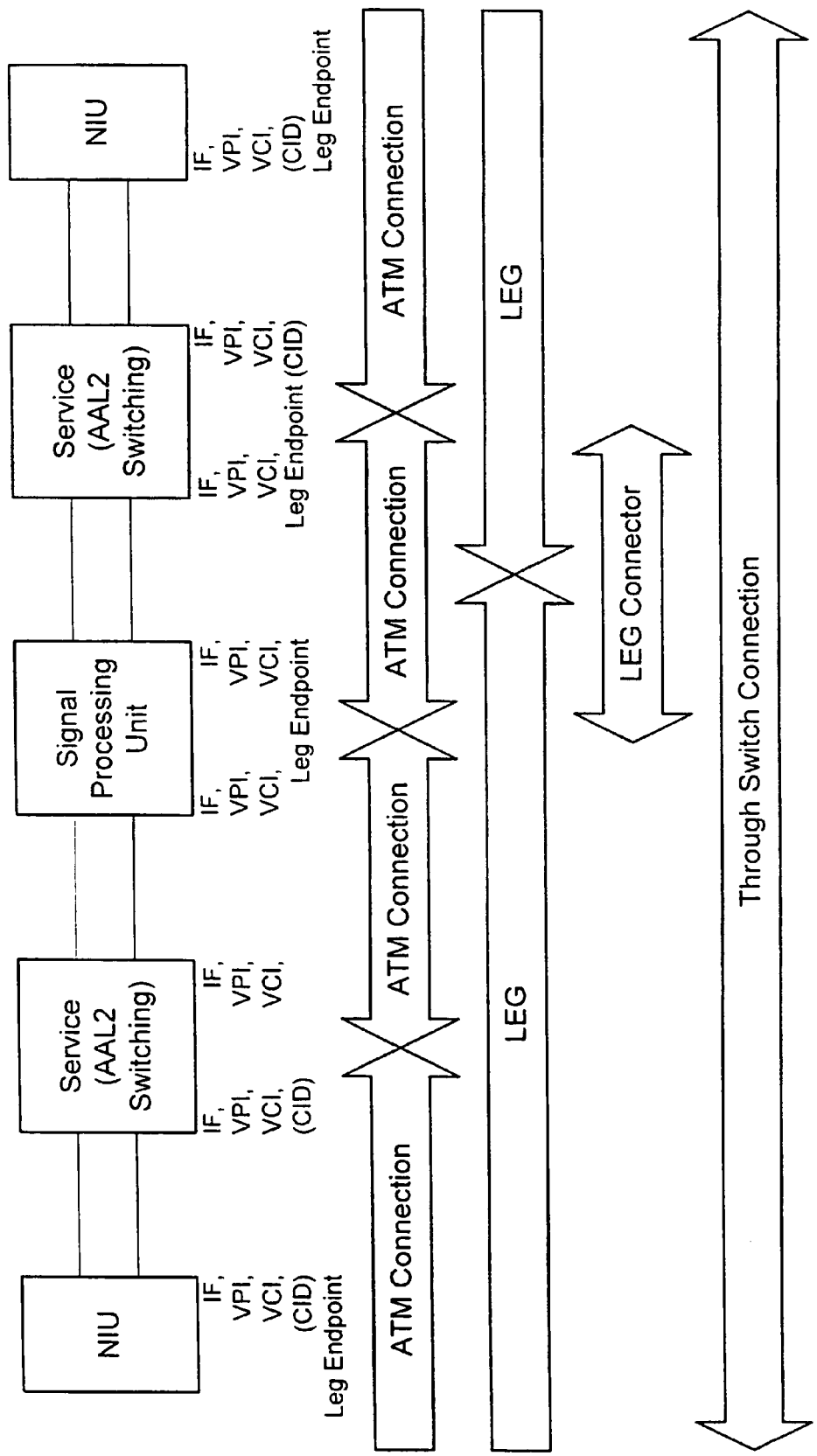
FIG. 5 is a diagram illustrating the steps for through switch connection using ATM connections and leg concept.

FIG. 3 shows the structure of a DSP unit, wherein several groups 6 to 9 of DSPs are provided, with each group being assigned to one of several SAR devices 10 (which may be based on PowerQuick2, PQ2, concept). Here, the SAR devices 10 are arranged between an associated group 6, 7, 8, or 9 of DSPs, and the FIFO memory 4, as shown in FIG. 3.

Contrary to a concept in which an used virtual path identifies a processor, it is essential, according to the present invention (VP piping), that all the processors in one unit can share the same VP, and the VC value is used for distinguishing between the processors. Furthermore, no processor is permanently tied to a certain VC/VP.

According to this hardware solution, each processor has to discard an average of 75% of all received cells. Any cell misinsertion ratio counters will therefore be set to high admissible values.

For allowing an easy updating of the UTOPIA FIFO functionality and providing additional support for the VP piping, a hardware solution replacing UTOPIA FIFO may be provided which is a switch type of solution.

In the following, the solution will be described from the software point of view. Regarding the basic functionality, the software managing the VP-piping will be changed compared to a software managing the system with dynamic legs. The main issue in setting up of legs is that no setup on the ATM-layer is required because VP is used. The VPC may be set-up made on first request between two units, or may be VPC preconfigured. When the VPC connection means tries to select a used VP, it will be necessary to select another unit because that VP is already connected. This means that DSP resource manager or AAL2 connection control cannot select, for routing, an appropriate VP value individually, and create some VCltp (Virtual Channel Link Termination Point) below selected VPLtp (Virtual Path Link Termination Point) and create cross connection between selected VCLtps. This is how the system works when using dynamical leg setup.

In the new VP-piping concept presented here, the set-up uses a co-operation between DSP RM (Resource Manager) and AAL2 connection control. This co-operation means that both resource managers select a set of resources (AAL2 switching unit and DSP processors) where there is still resources available for a new "connection". The term "set of resources" means the exact processor/DSP processor that is available for the leg. The processor further defines a set of VPC connections. A set of VPC connections are all the connections from one unit (as already stated above, unit's processors share the VPC). The set of VPCs might be limited below maximum if CAC (Connection Admission Control) functionality considers certain VPC as fully booked. The sets defined by both resource managers involved (DSP RM-AAL2 CC (connection control), or AAL2 CC and AAL2 CC) is compared with each other—the comparison result indicates the set of possible VPCs to be used for this leg and one of those is selected. These procedures are the basic rules. Additionally, for example, the macro diversity combining function can further restrict the selection DSP unit to exactly one possible unit since the unit already handles one "sister" leg of same connection. The selection of the AAL2 switching unit may also be restricted to one unit if that unit handles the N_cid required. In these case the set is actually limited to only these sets of VP connections that are possible. In some case there is only VPC possible. If it does not have resource available, the connection needs to be rejected.

The selection of VC-values has to be coordinated because in the VP switching the VCI value is the same in both ends of the connection. This is actually quite a simple task since VCI space under VPC is common for both ends. If selection of VCI value is made in one side and delivered to the other side the process will automatically be successful. Either one will have VCI reserved. If the same VCI should be attempted to be reserved twice, this will not be accepted.

In the following the configuration of connections will be described. The configuration of VPCs can take place either beforehand, for instance at the start-up of the whole system, or at the time the first 1_cid is created between two units. In the first alternative, the resources for VPC are reserved for the whole time. This means that the resources cannot be used by another connection. This can be a problem in network elements which have no extra switching capacity. However, this solution is simpler to implement and very quick as no delays in the set-up due to VPC setup will be caused.

The second alternative, that is a solution which requests VPC only at the time when the first connection is created between two units, is more complicated to implement, but uses switching resources only when needed and is more suitable for a system with very limited switching capacity. The setup of a VP connection may cause a brief delay to connection setup. However, this concerns only a very small part of the connection. Furthermore, these situations will presumably occur mostly after restart. This solution can be more flexible also in a failure situation because it has the means for VPC setup "by heart", that is adapting to the present configuration of the network, whereas the other solution is bound to a fixed configuration.

The following explanations deal with the identification of the VP connections. A VP selection method to select VC sc. internal routing method is not very usable in the VP piping. In the VP piping the object to identify is the cross-connection between two units. Thus, the identification is tied to two units. The units can be identified by internal interface identifier or by some functional unit index and type. A unit identified needs further refining for the identification of the processor in the unit. Also the connection needs to be identified by the VPI values of the VPC termination point.

Preferably, the connection is identified by using logical interface ID/VPI pair. The connections can also be identified by using logical interface identifier pair but this means that VPI values have to be found by other means. The resource managers usually know each unit logical interfaces so as to be able to reserve VCLTPs.

In the following, some management cases will be considered. A source of failure cases may be that the resource managers (DSP RM, AAL2 CC) handle the non-redundant "resource pools" (AAL2 Termination and switching and DSP units) of the NE (network element).

One basic function of the resource manager is to follow the operationality of the resources. In case of failure in resource the information is transferred to the knowledge of resource manager. Resource manager will use this information to prevent the use of the faulty resource.

It has to be mentioned that prevention of using such a resource is enough since the release of calls is left for signaling.

If the functional unit state of a certain processor changes it means that use of this processor must be prevented. However, it is not necessary to release all the connections to that unit since the same connection is shared with the other processors as well. If a top level functional unit state changes it means that all the connections can be released. Every state change possibility needs to be considered before starting the implementation.

Regarding to connection admission control (CAC), and especially the resource reservation, several approaches can be taken, such as bulk reservation, or reserving VP bandwidth, while VCs are reserved from SARs. Bulk reservation means that bandwidth for the VPC is allocated as CBR (constant bit rate) with highest estimation of traffic through that link. This approach is favorable if there is enough resource available. However, if the ATM switching resources are limited more resources than are actually used will be reserved. Another solution is that every time a 1 cid is reserved inside VPC, the reservation of VPC is increased.

This approach uses resources in a more efficient way but is required separately for each connection setup.

The VP-piping setups can be defined with fixed configuration. The invention achieves a significant reduction of messages necessary for establishing connections as compared with a conventional case.

In the following the number of messages sent/received in a practical example of the invention will be listed for several different cases, wherein the number of messages needed in a conventional case are indicated in brackets for comparison purpose.

The number of messages for general set-up is 32 (66). The number of messages for set-up between individual units is only 6 (26). For general deletion, 30 (54) messages are exchanged. A deletion between units requires 10 (18) messages. The estimated traffic from RSMU is around 8,100 (22,000) messages.

This comparison illustrates the significant reduction of messages to be exchanged and, thus, of processor load for connecting calls in the shown embodiment.

The invention claimed is:

1. A method for connection set-up in a communication system which comprises a plurality of first processing units and a plurality of second processing units, said method comprising:
   transmitting information as a stream of information cells having cell identification,
   wherein the plurality of first processing units are connected to the plurality of second processing units using virtual path connections on an asynchronous transfer mode layer;
   supplying information cells to a plurality of second processing units which distinguish between the cells based on the cell identification for further processing,
   generating virtual path connections between the plurality of first processing units and the plurality of second processing units and between each of the plurality of first processing units;
   copying using the first processing units, in the direction towards the second processing units, each received cell to each second processing unit;
   checking a virtual path identifier and a virtual channel identifier of a received cell; and
   processing using a second processing unit a received cell when the received cell has the same virtual path identifier and virtual channel identifier as a channel opened in the second processing unit, otherwise discarding the received cell by the second processing unit,
   wherein the plurality of first processing units or the plurality of second processing units share the same virtual path.

2. The method according to claim 1, wherein the first processing units are asynchronous transfer mode adaptation layer switching units and the second processing units are signal processing units.

3. The method according to claim 1, wherein the first and second processing units are asynchronous transfer mode adaptation layer switching units.

4. The method according to claim 1, wherein the first and second processing units are signal processing units.

5. The method according to claim 1, wherein the information is asynchronous transfer mode transmitted.

6. The method according to claim 1, wherein the first and/or second processing units each contain one or more digital signal processing units.

7. The method according to claim 1, wherein the processing unit, to which the information cell is directed, is identified using a virtual channel identifier.

8. The method according to claim 1, wherein resources between the first and second processing units are reserved by virtual path.

9. The method according to claim 7, wherein the virtual channel identifiers are known only in the first and second processing units.

10. The method according to claim 1, wherein cell identifications are allocated by a resource manager.

11. The method according to claim 1, wherein the first and/or second processing units comprise asynchronous transfer mode adaptation layer switching units which differentiate different asynchronous transfer mode adaptation layers by different virtual channel identifiers.

12. A system for connection set-up in a communication system, comprising:
   a plurality of first processing units; and
   a plurality of second processing units, and
   wherein said system is configured to transmit information as a stream of information cells having cell identification,
   wherein, for setting up connections, the plurality of first processing units are connected to the plurality of second processing units using virtual path connections on an asynchronous transfer mode layer, and
   wherein information cells are supplied to a plurality of second processing units which distinguish between the cells based on the cell identification for further processing;
   virtual path connections between the plurality of first processing units and the plurality of second processing units and between each of the first processing units,
   wherein the first processing units is configured to copy, in the direction towards the second processing units, each received cell to each second processing unit,
   wherein a virtual path identifier and a virtual channel identifier of a received cell is checked, and the second processing unit is configured to process a received cell when the received cell has the same virtual path identifier and virtual channel identifier as a channel opened in the second processing unit, otherwise the second processing unit discards the received cell, and
   wherein the plurality of the first processing units or the plurality of the second processing units share the same virtual path.

13. The system according to claim 12, wherein the first processing units are asynchronous transfer mode adaptation layer switching units and the second processing units are signal processing units.

14. The system according to claim 12, wherein the first and second processing units are asynchronous transfer mode adaptation layer switching units.

15. The system according to claim 12, wherein the first and second processing units are signal processing units.

16. The system according to claim 12, wherein the information is asynchronous transfer mode transmitted.

17. The system according to claim 12, wherein the first and/or second processing units each contain one or more digital signal processing units.

18. The system according to claim 12, wherein the processing unit to which the information cell is directed is identified using a virtual channel identifier.

19. The system according to 12, wherein resources between the first and second processing units are reserved by virtual path.

20. The system according to claim 18, wherein virtual channel identifiers are known only in the first and second processing units.

21. The system according to 12, comprising a resource manager for allocating the cell identifications.

22. The system according to claim 12, wherein the first and/or second processing units comprise AAL switching units which differentiate different asynchronous transfer mode adaptation layers by different virtual channel identifiers.

23. An apparatus for connection set-up in a communication system which includes a plurality of first processing units and a plurality of second processing units, comprising:
   means for transmitting information as a stream of information cells having cell identification,
   wherein the plurality of first processing units are connected to the plurality of second processing units using virtual path connections on an asynchronous transfer mode layer;
   means for supplying information cells to the plurality of second processing units which distinguish between the cells based on the cell identification for further processing;
   means for generating virtual path connections between the plurality of first processing units and the plurality of second processing units and between each of the plurality of first processing units;
   means for copying using the plurality of first processing units, in the direction towards the plurality of second processing units, each received cell to each of the plurality of second processing units;
   means for checking a virtual path identifier and a virtual channel identifier of a received cell; and
   means for processing using a second processing unit a received cell when the received cell has the same virtual path identifier and virtual channel identifier as a channel opened in the second processing unit, otherwise discarding the received cell by the second processing unit,
   wherein the plurality of first processing units or the plurality of second processing units share the same virtual path.

24. An apparatus for connection set-up in a communication system, comprising:
   a plurality of first processing units and a plurality of second processing units,
   the plurality of first processing units are configured to transmit information as a stream of information cells having cell identification,
   wherein the plurality of first processing units are connected to the plurality of second processing units using virtual path connections on an asynchronous transfer mode layer,
   wherein information cells are supplied to the plurality of second processing units which distinguish between the cells based on the cell identification for further processing,
   wherein the virtual path connections are generated between the plurality of first processing units and the plurality of second processing units and between each of the plurality of first processing units,
   wherein the plurality of first processing units is configured to copy, in the direction towards the plurality of second processing units, each received cell to each of the plurality of second processing units,
   wherein a virtual path identifier and a virtual channel identifier of a received cell is checked,
   wherein the second processing unit is configured to process a received cell when the received cell has the same virtual path identifier and virtual channel identifier as a channel opened in the second processing unit, otherwise discarding the received cell by the second processing unit, and
   wherein the plurality of first processing units or the plurality of second processing units share the same virtual path.

25. A computer program embodied on a computer readable medium having a connection set-up process for a communication system which comprises a plurality of first processing units and a plurality of second processing units, the program comprising:
   transmitting information as a stream of information cells having cell identification,
   wherein the plurality of first processing units are connected to the plurality of second processing units using virtual path connections on an asynchronous transfer mode layer;
   supplying information cells to the plurality of second processing units which distinguish between the cells based on the cell identification for further processing;
   generating virtual path connections between the plurality of first processing units and the plurality of second processing units and between each of the plurality of first processing units;
   copying using the plurality of first processing units, in the direction towards the plurality of second processing units, each received cell to each of the plurality of second processing units;
   checking a virtual path identifier and a virtual channel identifier of a received cell; and
   processing using a second processing unit a received cell when the received cell has the same virtual path identifier and virtual channel identifier as a channel opened in the second processing unit, otherwise discarding the received cell by the second processing unit,
   wherein the plurality of first processing units or the plurality of second processing units share the same virtual path.

26. The method of claim 1, further comprising determining a distinction between which of the second processing units will actually use the cell and will not discard the cell based on active segmentation and reassembly channels.

27. The method of claim 1, wherein the virtual channel identifier is for distinguishing between the processors.

28. The system according to claim 12, wherein a distinction between which of the second processing units will actually use the cell and will not discard the cell is determined based on active segmentation and reassembly channels.

29. The system according to claim 12, wherein the virtual channel identifier being used for distinguishing between the processors.

30. The apparatus of claim 23, further comprising means for determining a distinction between which of the plurality of second processing units will actually use the cell and will not discard the cell based on active segmentation and reassembly channels.

31. The apparatus of claim 23, wherein the virtual channel identifier being used for distinguishing between the processing units.

32. The apparatus of claim 24, wherein a distinction between which of the plurality of second processing units will actually use the cell and will not discard the cell is made based on active segmentation and reassembly channels.

33. The apparatus of claim 24, wherein the virtual channel identifier being used for distinguishing between the processing units.

34. The program of claim 25, further comprising determining a distinction between which of the plurality of second processing units will actually use the cell and will not discard the cell based on active segmentation and reassembly channels.

35. The program of claim 25, wherein the virtual channel identifier being used for distinguishing between the processing units.

* * * * *